(12) United States Patent
Cotteleer

(10) Patent No.: US 11,838,667 B2
(45) Date of Patent: Dec. 5, 2023

(54) READOUT CIRCUIT, READOUT STAGE, IMAGE SENSOR, ELECTRONIC DEVICE AND METHOD FOR READING OUT AN IMAGE SENSOR

(71) Applicant: ams Sensors Belgium BVBA, Antwerp (BE)

(72) Inventor: Wesley Cotteleer, Antwerp (BE)

(73) Assignee: AMS SENSORS BELGIUM BVBA, Antwerp (BE)

( * ) Notice: Subject to any disclaimer, the term of this patent is extended or adjusted under 35 U.S.C. 154(b) by 326 days.

(21) Appl. No.: 17/436,249

(22) PCT Filed: Feb. 5, 2020

(86) PCT No.: PCT/EP2020/052839
§ 371 (c)(1),
(2) Date: Sep. 3, 2021

(87) PCT Pub. No.: WO2020/182375
PCT Pub. Date: Sep. 17, 2020

(65) Prior Publication Data
US 2022/0166947 A1    May 26, 2022

(30) Foreign Application Priority Data
Mar. 12, 2019  (EP) .................................... 19162296

(51) Int. Cl.
*H04N 25/75*  (2023.01)
*H04N 25/76*  (2023.01)
(52) U.S. Cl.
CPC ............. *H04N 25/75* (2023.01); *H04N 25/76* (2023.01)
(58) Field of Classification Search
CPC ........ H04N 25/75; H04N 25/76; H04N 25/40; H04N 25/77
See application file for complete search history.

(56) References Cited

U.S. PATENT DOCUMENTS

| 6,885,396 B1 * | 4/2005 | Panicacci ............. H04N 25/616 |
| | | 341/172 |
| 2003/0214591 A1 * | 11/2003 | Kakumoto ............. H04N 25/75 |
| | | 348/E5.079 |

(Continued)

FOREIGN PATENT DOCUMENTS

CN    103875237 A    6/2014
CN    108184081 A    6/2018

(Continued)

OTHER PUBLICATIONS

S. Kawahito, "Signal Processing Architectures for Low-Noise High-Resolution CMOS Image Sensors", IEEE 2007 Custom Intergrated Circuits Conference (CICC), 2007, pp. 695-702.

(Continued)

*Primary Examiner* — Nhan T Tran
(74) *Attorney, Agent, or Firm* — MH2 TECHNOLOGY LAW GROUP LLP

(57) ABSTRACT

A readout circuit for an image sensor having a pixel array with at least one pixel group, in particular pixel column, with a plurality of pixels connected to a group bus comprises a group input for connecting to the group bus and a signal output for connecting to an input of an ADC. The readout circuit further comprises a first and a second reference terminal for receiving a first and a second reference voltage. A sampling bank comprises at least two sample-and-hold elements connected in parallel between the group input and an output of the sampling bank and further comprises a bypass switch connected in parallel to the sample-and-hold elements. A charge store is connected between the output of the sampling bank and the signal output. A first charge switch is connected between the first reference terminal and the signal output, and a second charge switch is connected (Continued)

between the second reference terminal and the output of the sampling bank.

17 Claims, 7 Drawing Sheets

(56) References Cited

U.S. PATENT DOCUMENTS

| | | | | |
|---|---|---|---|---|
| 2005/0088535 A1* | 4/2005 | Hatano | ................ | H04N 25/136 |
| | | | | 348/E9.01 |
| 2009/0190018 A1* | 7/2009 | Sakakibara | ............ | H04N 25/65 |
| | | | | 348/308 |
| 2010/0053379 A1* | 3/2010 | Willassen | .............. | H04N 25/63 |
| | | | | 348/E5.079 |
| 2010/0315540 A1* | 12/2010 | Hoshino | .............. | H04N 25/778 |
| | | | | 341/122 |
| 2012/0162484 A1 | 6/2012 | Mo et al. | | |
| 2016/0191830 A1 | 6/2016 | Nishihara et al. | | |
| 2018/0359441 A1* | 12/2018 | Luo | ........................ | H04N 25/75 |

FOREIGN PATENT DOCUMENTS

| | | |
|---|---|---|
| CN | 108391071 A | 8/2018 |
| EP | 1349377 A1 | 10/2003 |
| JP | 2003289477 A | 10/2003 |
| JP | 2005130382 A | 5/2005 |

OTHER PUBLICATIONS

Doswald, Daniel (EP Examiner), International Search Report and Written Opinion in corresponding International Application No. PCT/EP2020/052839 dated Mar. 13, 2020, 10 pages.

Chinese Patent Certificate and Announcement of Granted Chinese invention dated Aug. 21, 2023, issued in Chinese Patent Application No. 202080016149.2, with English translation, 26 pages.

* cited by examiner

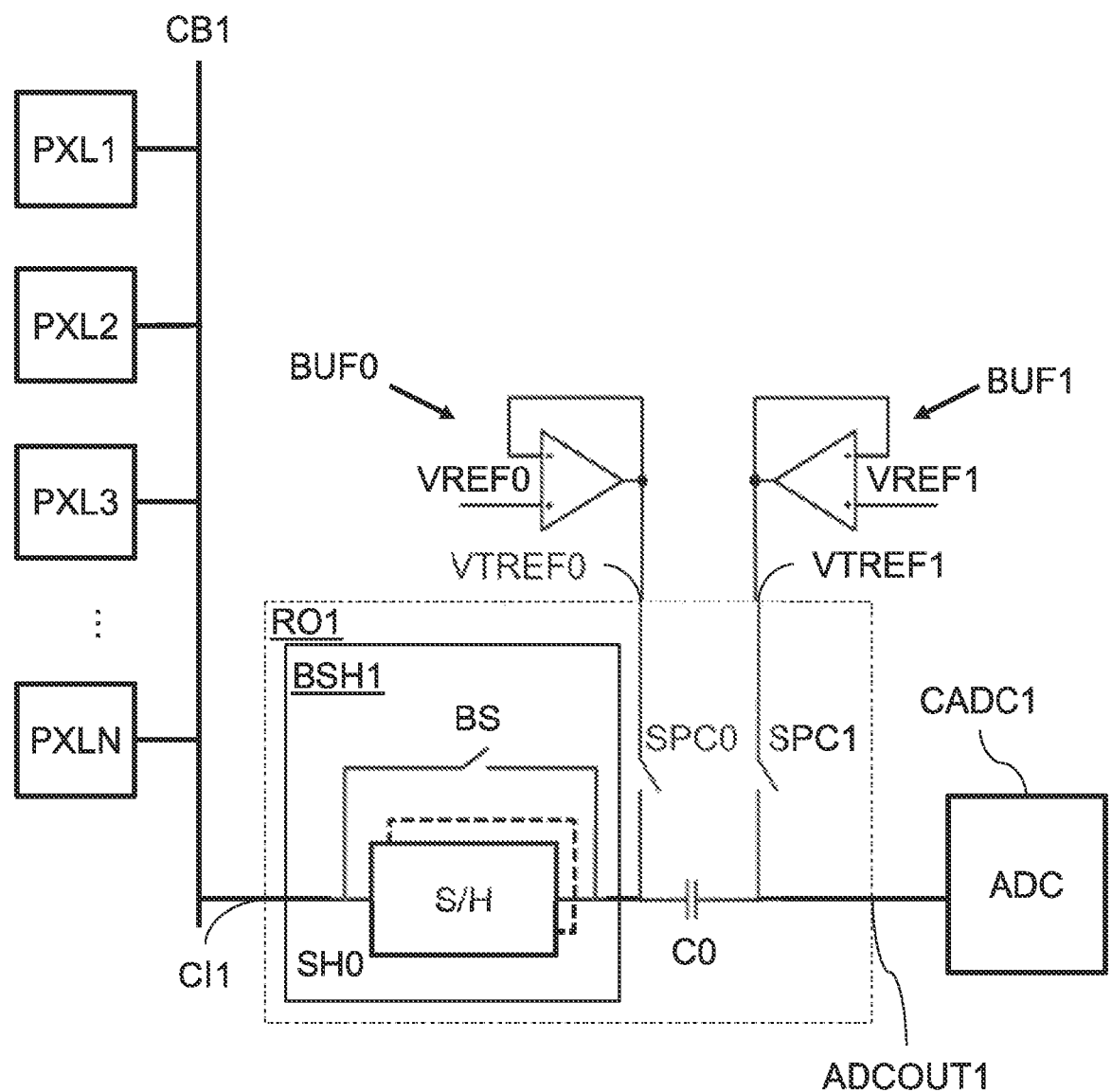

READOUT CIRCUIT, READOUT STAGE, IMAGE SENSOR, ELECTRONIC DEVICE AND METHOD FOR READING OUT AN IMAGE SENSOR

CROSS-REFERENCE TO RELATED APPLICATIONS

The present application is the national stage entry of International Patent Application No. PCT/EP2020/052839, filed on Feb. 5, 2020, and published as WO 2020/182375 A1 on Sep. 17, 2020, which claims the benefit of priority of European Patent Application Nos. 19162296.8, filed on Mar. 12, 2019, all of which are incorporated by reference herein in their entirety.

FIELD OF INVENTION

The present disclosure relates to a readout circuit, to a readout stage with such readout circuit, to an image sensor with such a readout circuit, to an electronic device with a camera system comprising such an image sensor and to a method for reading out an image sensor.

BACKGROUND OF THE INVENTION

Image sensors, for example CMOS image sensors, CIS, usually comprise an array of unit elements, called pixels. The array of pixels is exposed to radiation during an exposure period and, subsequently, the signal value of each pixel is read from the array.

In image sensors the pixels and readout circuitry often introduce random noise in the image, an unwanted side-product of image capture. For example, in a typical CIS, the readout occurs during two phases. These two readout phases correspond to two different signal levels typically called the "reset" level and the actual "signal" level. By subtracting these two signal levels, any common mode noise, as well as some low frequency noise (1/f noise), between them can be eliminated. This is called correlated double sampling, CDS. For low noise image capture, CDS is widely used.

These two signal levels are subsequently converted using an analog-to digital converter, ADC. Ramp based ADCs are widely used in CIS. In such an ADC architecture, the signal level and a linearly sloping ramp signal are applied to a comparator and a counter starts counting at the start of the conversion phase. At the crossing point of these two signals, the comparator toggles and the value of the counter is latched into a memory. The larger the voltage range of the input signal, the longer the conversion takes. In conventional image sensors, the reset level can show a large variation, e.g. due to variations of the pixel transistors. A large variation in the reset level will require a longer ramping phase to convert the reset level. This will increase the conversion time of the ADC and reduce the frame rate of the image sensor. In conventional image sensors many programmable gain amplifiers, PGA, are used in the readout path. The PGA perform several functions including CDS and accurately defining a "reset" level for the pixels. PGA require a substantive amount of space in the layout of the pixel and increase power consumption.

An object to be achieved is to provide an improved signal processing concept for reading out a pixel array of an image sensor with improved performance.

This object is achieved with the subject matter of the independent claims. Embodiments and developments of the improved signal processing concept are defined in the dependent claims.

SUMMARY OF THE INVENTION

A pixel array may have a multitude of pixels organized in a structure with one or more pixel groups, e.g. pixel columns, to form a linear image sensor or a two-dimensional image sensor. The grouping can be made column by column, row by row or according to other criteria, e.g. to form sub-arrays. For example, each of the pixels comprises a photodiode and a pixel buffer, for example a source follower, coupled to the photodiode. In various implementations of a pixel, a so-called floating diffusion is present at the input of the pixel buffer. A transfer gate may or may not be foreseen between the photodiode and the pixel buffer. An output of the pixel buffer often corresponds to an output of the respective pixel.

Accordingly, a pixel array comprises at least one pixel group, e.g. pixel column, with a plurality of pixels connected to a group bus or column bus, to which a readout circuit can be connected.

The improved signal processing concept is based on the idea that for each pixel group of an image sensor, a sampling structure with two or more sample-and-hold elements is provided in a respective readout circuit that allows pipelined readout and sampling of the pixels of the pixel group, e.g. pixel column. The sampling structure further includes a bypass switch connecting the input and the output of the sampling structure. This way a signal received from the pixel group can be directly transferred to a charge store connected between the output of the sampling structure and a signal output that is connectable to an input of an analog-to-digital converter, ADC. Furthermore, the terminals of the charge store are connected to respective reference terminals to which respective reference voltages can be provided. This, for example, allows, together with the bypass switch, to provide a defined reset level to the ADC, which in turn can reduce a sensitivity to the variations of the transistors in the pixel and further reduce the conversion time of the ADC. Furthermore a sensitivity to other variations in the pixels like reference voltages, e.g. used as reset level, may be reduced.

The same readout structure can be employed for each pixel group, e.g. pixel column, of a multi-group or multi-column pixel array. In such a configuration, respective single voltage buffers for providing the one or two respective reference voltages may be sufficient for the whole pixel array, such that both area and power consumption can be reduced.

In an embodiment according to the improved signal processing concept, a readout circuit for an image sensor having a pixel array is proposed, the pixel array comprising at least one pixel group, e.g. pixel column, with a plurality of pixels connected to a group bus or column bus. The readout circuit comprises a group input or column input for connecting to the group bus or column bus and a signal output for connecting to an input of an analog-to-digital converter, ADC. The readout circuit further comprises a first reference terminal for receiving a first reference voltage and a second reference terminal for receiving a second reference voltage. A sampling bank of the readout circuit comprises a first sample-and-hold element and an at least second sample-and-hold element coupled between the column input and an output of the sampling bank. The sampling bank further comprises a bypass switch connected between the column input and the output of the sampling bank, e.g. in parallel to the first and the at least second sample-and-hold element. A charge store is connected between the output of the sampling bank and the signal output. A first charge switch is connected between the first reference terminal and the signal output and a second charge switch is connected between a second reference terminal and the output of the sampling bank.

The structure of sample-and-hold elements in the sampling bank allows pipelined sampling and readout of the respective voltage levels of the pixels of the pixel group. Furthermore, the bypass switch together with the charge store and the reference voltages allows providing defined signal levels at the signal output, in particular a defined reset level. In addition, as both terminals of the charge store can be individually charged with the respective reference voltages, defined conditions when reading out the signal level of the pixel can be established.

As no active circuit components, in particular no amplifiers, are needed in the readout circuit, no noise is introduced during the readout process. The structure of the readout circuit allows to perform a controlled sampling and readout of the respective signal levels received from the pixels via the group bus, respectively group input, and further allows to ensure well-defined signal levels being provided at the signal output for processing with an ADC.

For example, the readout circuit is configured, during a sample phase, which may be a first sample phase, to sample a reset level voltage and a signal level voltage received, e.g. consecutively received, at the group input from one of the pixels of the at least one pixel group, employing the first sample-and-hold element and the at least second sample-and-hold element. It can be chosen arbitrarily whether first the reset level or first the signal level is sampled.

The readout circuit is further configured, during a calibration phase, to close the bypass switch and to connect the signal output to the first reference terminal employing the first charge switch. For example, this allows to charge the charge store with a voltage corresponding to a difference between the first reference voltage and the voltage level provided from the pixel. For example, during the calibration phase, the reset level voltage is provided from the pixel at the group input and hence to the output of the sampling bank, respectively the connected charge store.

The readout circuit is further configured, during a readout phase, which may be a first readout phase, to read out, for example consecutively read out, the sampled reset level voltage and the sampled signal level voltage from the first sample-and-hold element and the at least second sample-and-hold element. The sequential order of reading out the sampled voltages can be chosen arbitrarily and can differ from the sequence, with which the voltage levels had been sampled during the sampling phase. Hence, a flexible pipelining can be achieved. Furthermore, due to the combination with the charging in the calibration phase, accuracy of the read out voltages, respectively the voltages provided at the signal output, can be increased.

For example, the readout circuit may be configured, during the first readout phase, to connect the output of the sampling bank to the second reference terminal employing the second charge switch for a predetermined time before the readout of the sampled reset level voltage and before the readout of the sampled signal level voltage. For example, the connection is made before each of the single readout processes. Hence, a charge distribution between a storage element of the respective sample-and-hold element and the charge store downstream of the sampling bank starts with defined conditions, further increasing the accuracy of the read out signals.

If the pixel group is organized as a pixel column, the pixels of such a pixel column are usually organized as a plurality of rows such that the pixel array is formed of the at least one pixel column and a plurality of rows.

If the sampling bank comprises two sample-and-hold elements, as comprised by the examples described above, pipelining of reset level and signal level of the pixel of a single row can be performed. However, if a third and a fourth sample-and-hold element are provided in the sampling bank, pipelined operation for two rows is possible. Pipelining is also applicable to other forms of pixel groups, which should be apparent to the skilled reader.

For example, the sampling bank further comprises a third sample-and-hold element and a fourth sample-and-hold element, connected in parallel to the first and the second sample-and-hold elements. Hence, while a reset level and a signal level of one row can be sampled with two of the four sample-and-hold elements, previously stored voltage levels can be read out from the other two sample-and-hold elements.

For example, in such a configuration, the readout circuit may be further configured, during a second readout phase, which at least partially is overlapping with the first sampling phase, to read out, for example consecutively read out, a previously sampled reset level voltage and a previously sampled signal level voltage from the third sample-and-hold element and the fourth sample-and-hold element. It should be noted that an exact synchronization between the sampling process of the first sampling phase and the readout process of the second readout phase is not required.

The readout circuit is further configured, during a second sampling phase, which at least partially is overlapping with the first readout phase, to sample a further reset level voltage and a further signal level voltage and a further signal level voltage received, for example consecutively received, at the column input from a further one of the pixels of the at least one pixel group, employing the third sample-and-hold element and the fourth sample-and-hold element. For example, the further one of the pixels of the pixel array is associated with a different row of the group compared to the pixel sampled during the first sampling phase.

It should be apparent to the skilled reader that readout, sampling and control of the charge switches and the bypass switch are carried out by means of respective control signals. Such control signals can be generated by respective control circuitry that may be part of the readout circuit or that may be external to the readout circuit and for example common to several readout circuits associated with different pixel groups of the pixel array.

In various embodiments, the first sample-and-hold element and the at least second sample-and-hold element are connected in parallel to each other and to the bypass switch between the group input and the output of the sampling bank. Moreover, if an implementation with a third and a fourth sample-and-hold element is chosen, these can each be connected in parallel to the first and the second sample-and-hold element, and consequently, to the bypass switch.

In alternative embodiments, the first sample-and-hold element and the at least second sample-and-hold element form a cascade that is connected between the group input and the output of the sampling bank in parallel to the bypass switch. Moreover, if an implementation with a third and a fourth sample-and-hold element is chosen, these may form another cascade, that is connected between the group input and the output of the sampling bank in parallel to the cascade of the first and the second sample-and-hold element, and consequently, to the bypass switch.

While several implementations of a readout circuit for a single pixel group, e.g. pixel column have been described above, the improved signal processing concept can be further implemented in a readout stage for an image sensor having a pixel array with at least two pixel groups, e.g. pixel columns, where each pixel group with a plurality of pixels is connected to a respectively associated group bus of that pixel group. For example, the readout stage comprises, for each of the pixel groups, an associated readout circuit according to one of the implementations described above, having its group input connected to the associated group bus. For example, such a readout stage may further comprise one or two voltage buffers for connecting to the respective reference terminals of each of the readout circuits.

For example, the readout stage comprises a first voltage buffer for providing a first reference voltage, wherein an output of the first voltage buffer is connected to the respective first reference terminals of each of the readout circuits. In addition, or as an alternative, the readout stage may further comprise a second voltage buffer for providing the second reference voltage, wherein an output of the second voltage buffer is connected to the respective second reference terminals of each of the readout circuits. Accordingly, only one or two voltage buffers are provided for the whole readout stage with a plurality of readout circuits as described above. This reduces area and power consumption of the overall circuit.

For example, if only one voltage buffer is provided, this voltage buffer can be connected to both the first and the second reference terminals of the readout circuits, such that the same reference voltage is present at both terminals. Still a controlled provision of respective signal levels at the signal outputs of the readout circuits is possible. If two buffers with two different reference voltages are provided, the respective voltage levels can be adapted more flexibly.

While it may be sufficient to provide only one or two voltage buffers as described before, it is not excluded that the readout stage includes a greater number of voltage buffers, each of the voltage buffers providing the respective reference voltage to several readout circuits together. With high image sensor resolutions, resulting in a large number of pixel groups, e.g. pixel columns, still large groups of pixel groups and associated readout circuits can be formed, each of the groups being provided with a respective voltage buffer. Area consumption is still reduced compared to having buffer structures or amplifier structures for each pixel group.

The improved signal processing concept also proposes an image sensor comprising a pixel array with at least two pixel groups, e.g. pixel columns, each pixel group with a plurality of pixels connected to a respectively associated group bus of that pixel group and further comprising, for each of the pixel groups, an associated readout circuit according to one of the implementations described above and having its group input connected to the associated group bus.

The image sensor may further comprise a first and/or a second voltage buffer as described before in conjunction with the implementations of the readout stage. In other words, the image sensor may comprise the pixel array and a readout stage according to one of the implementations described above.

In various implementations, the image sensor may further comprise, for each readout circuit, an associated ADC, for example ramp-based ADC, connected to the respective signal output of that readout circuit. Accordingly, such ADCs can also be titled "group ADCs" or "column ADCs".

An image sensor according to one of the implementations described above can be used in a camera system of various electronic devices, for example.

Such electronic devices may include smartphones, tablet computers, portable computers and the like, but also larger devices such as personal computers and/or their displays. Electronic devices further include photo or video cameras and smart watches and other wearables. Suitable electronic devices further may be devices for machine vision, medical imaging or automotive imaging.

In another aspect of the improved signal processing concept, a method for reading out an image sensor having a pixel array and a readout circuit is proposed. The pixel array comprises at least one pixel group, e.g. pixel column, with a plurality of pixels connected to a group bus, and the readout circuit includes a sampling bank comprising a first sample-and-hold element and an at least second sample-and-hold embodiment coupled between the group bus and an output of the sampling bank. The readout circuit further comprises a bypass switch connected between the group input and the output of the sampling bank, and a charge store connected between the output of the sampling bank and a signal output. For example, the method can be performed with a readout circuit according to one of the implementations described above.

The method comprises, during a sampling phase, which may be a first sampling phase, sampling a reset level voltage and a signal level voltage received, for example consecutively received, at the group bus from one of the pixels of the at least one pixel group, employing the first sample-and-hold element and the at least second sample-and-hold element. The method further comprises, in a calibration phase, closing the bypass switch and providing a reference voltage to the signal output. The method further comprises, during a readout phase, which may be a first readout phase, to read out, e.g. consecutively read out, the sampled reset level voltage and the sampled signal level voltage from the first sample-and-hold element and the at least sample-and-hold element. As mentioned before for the readout circuit, the sequence of sampling and reading the signal level voltage and the reset level voltage can be chosen arbitrarily. Due to the parallel connected sample-and-hold elements, for example parallel sampling and reading out is not intended.

In some implementations, the method further comprises, during the first readout phase, providing the reference voltage or a further reference voltage to the output of the sampling bank for a predetermined time before the readout of the sampled reset level voltage and before the readout of the sampled signal level voltage, e.g. before each readout process. The defined reference voltage increases precision in the readout process.

In a further implementation of the method, during the calibration phase, the reset level voltage is provided to the output of the sampling bank by closing the bypass switch. Hence, the reset level voltage is directly provided without intermediate sampling and reading out with the sample-and-hold elements.

In some implementations, the method is intended for a configuration, where the sampling bank further comprises a third sample-and-hold element and a fourth sample-and-hold element, connected in parallel to the first and second sample-and-hold element. In such a configuration, the method further comprises, during a second readout phase, which is at least partially overlapping with the first sampling phase, reading out, e.g. consecutively reading out, a previously sampled reset level voltage and a previously sampled signal level voltage from the third sample-and-hold element and the fourth sample-and-hold element. Furthermore, during a second sampling phase, which is at least partially overlapping with the first readout phase, the method includes sampling a further reset level voltage and a further signal level voltage received, e.g. consecutively received, at the group bus from a further one of the pixels of the at least one pixel group, employing the third and the fourth sample-and-hold elements. Accordingly, signals from two different rows of a pixel group can be processed concurrently or in a pipelined fashion, such that the voltage levels of the pixel of one row are sampled and the voltage levels of a pixel of another row, which have been previously sampled, are read out.

In various implementations of the method, reading out comprises analog-to-digital conversion of a respective value at the signal output resulting from the respective voltage read out from the respective one of the sample-and-hold elements. It should be noted in this respect that not necessarily the voltage level stored on the sample-and-hold element is converted directly but under the influence of the charge, respectively voltage, of the charge store connected between the sampling bank and the signal output.

Further embodiments of the method become apparent for the skilled reader from the various embodiments described above for the readout circuit, the readout stage and the image sensor according to the improved signal processing concept.

The improved signal processing concept will be described in more detail below for several embodiments with reference to the drawings. Identical reference numerals designate signals, elements or components with identical functions. In so far as signals, elements or components correspond to one another in function, a description of them will not be repeated in each of the following figures.

BRIEF DESCRIPTION OF THE DRAWINGS

In the drawings:

FIG. 1 shows an example detail of an image sensor with a readout circuit according to the improved signal processing concept;

DETAILED DESCRIPTION

Figure 2A:
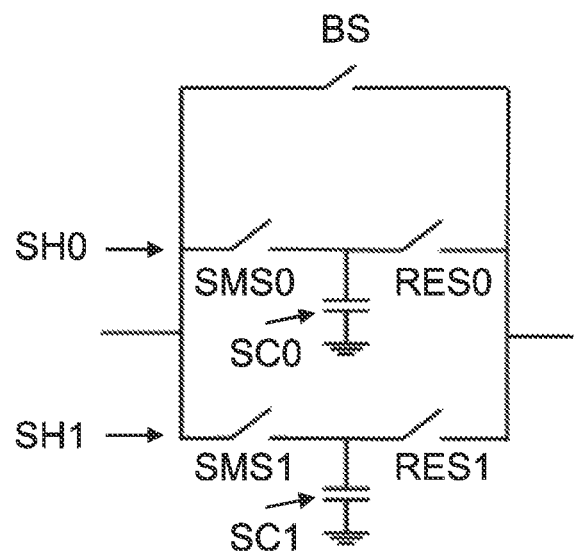
FIGS. 2A and 2B show example implementations of a sampling bank.

Image sensors, for example CMOS image sensors, CIS, regularly include a pixel array with a multitude of pixels organized in one or more pixel groups, e.g. pixel columns, each with a plurality of pixels. The array of pixels is exposed to radiation during an exposure period and subsequently the signal value of each pixel is read from the pixel array.

FIG. 1 shows an example detail of an image sensor, in particular one pixel group in form of a pixel column with a plurality of pixels PXL1, PXL2, PXL3, . . . , PXLN connected to a group bus or column bus CB1, and a readout circuit RO1 having a group input or column input CI1 connected to the column bus CB1 and a signal output ADCOUT connected to an ADC CADC1. The readout circuit RO1 comprises a sampling bank BSH1 being connected to the column input CI1 at its input side and to a charge store C0 at its output side. The charge store C0 may be implemented as a capacitor and may be called a feed forward capacitor.

In the following, the term "column" will be used as an example implementation of a "group" (of pixels). Hence the terms pixel group and pixel column, the terms group bus and column bus, and the terms group input and column input may be appreciated as being understood as being exchangeable insofar as "group" is a generalization of a "column".

While the first terminal of the charge store C0 is connected to the output of the sampling bank BSH1, the second terminal of the charge store C0 is connected to the signal output ADCOUT1. Furthermore, a first charge switch SPC1 connects the signal output ADCOUT1 to a first reference terminal VTREF1, and a second charge switch SPC0 connects the output of the sampling bank BSH1 to a second reference terminal VTREF0. Respective voltage buffers BUF1, BUF0 can be provided, which provide a first reference voltage VREF1 and a second reference voltage VREF0 to the first reference terminal VTREF1 and the second reference terminal VTREF0, respectively.

For simplicity reasons, the voltage buffers BUF1, BUF0 are shown as unity gain buffer amplifiers. However, the reference voltages VREF1, VREF0 could be provided to the respective reference terminals VTREF1, VTREF0 from other circuit implementations as well.

The buffer elements BUF1, BUF0, however, may be provided only once or at least with only a limited number of actual representations such that the reference voltages for a plurality of readout circuits are provided by the same buffer element.

The sampling bank BSH1 comprises a first sample-and-hold element SH0 and at least one further sample-and-hold element indicated by the dashed block. Furthermore, a bypass switch BS is connected in parallel to the sample-and-hold elements, i.e. between the group input CI1 and the output of the sampling bank BSH1. The illustration of FIG. 1 represents an implementation for a single pixel column. While a linear image sensor may have only this single pixel column, 2D image sensors usually have a plurality of pixel columns processed in parallel. Hence, in such an image sensor with several pixel columns, a readout circuit like the readout circuit RO1 shown in FIG. 1, can be provided for each pixel column or any other kind of pixel group. Furthermore, also a dedicated ADC may be provided for each pixel column, connected to the respective signal output of the readout circuit associated with this pixel column.

Figure 2B:
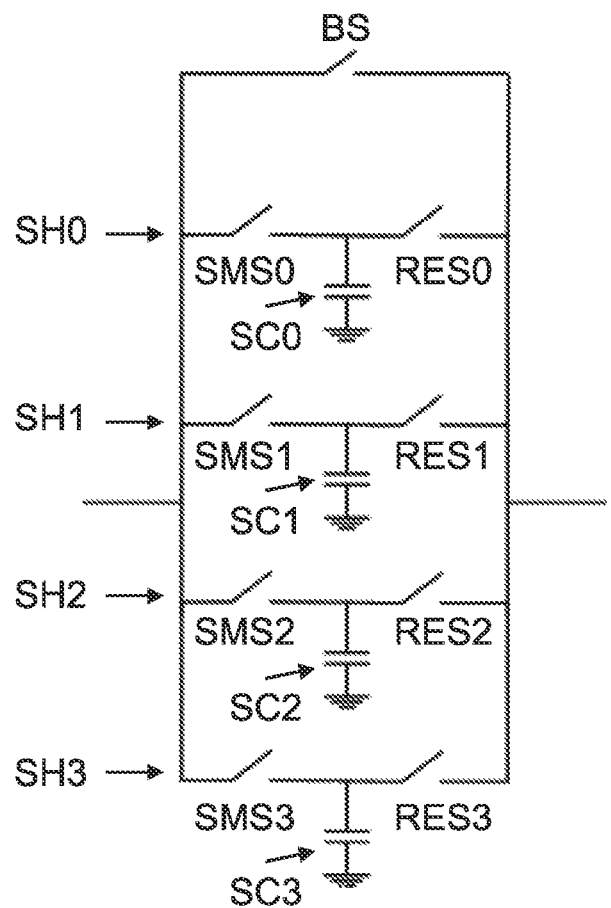

Referring now to FIG. 2A and FIG. 2B, example implementations of a sampling bank to be used in the readout circuit RO1 of FIG. 1 is illustrated, respectively. The implementation according to FIG. 2A includes two sample-and-hold elements SH0 and SH1, each comprising a sampling capacitor SC0, SC1, a sampling switch SMS0, SMS1 connecting the sampling capacitors SC0, SC1 to an input of the sampling bank, and respective readout switches RES0, RES1 connecting the sampling capacitors SC0, SC1 to the output of the sampling bank. The first and the second sample-and-hold element SH0, SH1 are connected in parallel between the input and the output of the sampling bank. Furthermore, the bypass switch BS is connected in parallel to both sample-and-hold elements SH0, SH1.

The sampling bank with two sample-and-hold elements allows pipelined processing of two voltage levels, for example a reset level voltage and a signal level voltage provided by one of the pixels. The bypass switch BS allows to provide a voltage level being present at the input side of the sampling bank directly to the output of the sampling bank without intermediate storage. This will be explained in more detail later.

Referring now to FIG. 2B, the structure of FIG. 2A is further equipped with a third and a fourth sample-and-hold element SH2, SH3, which each generally have the same structure as the first two sample-and-hold elements SH0, SH1. The third and the fourth sample-and-hold elements SH2, SH3 are also connected in parallel to the sample-and-hold elements SH0, SH1. Accordingly, they feature sampling capacitors SC2, SC3, sampling switches SMS2, SMS3 and readout switches RES2, RES3.

The two additional sample-and-hold elements SH2, SH3 allow the pipelined processing of four voltage levels, for example reset level voltage and signal level voltage of pixels of two different rows of a column.

It should be apparent to the skilled reader that provision of additional sample-and-hold elements would further increase the number of signals that can be pipelined.

Figure 3A:
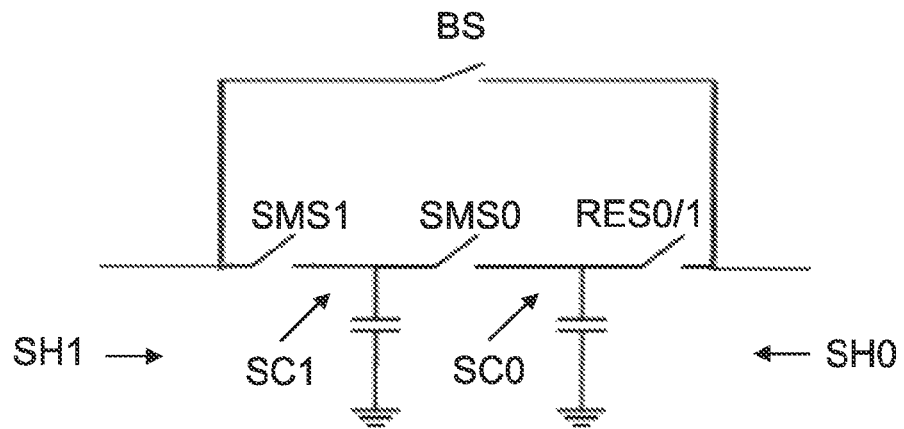
FIGS. 3A and 3B show further example implementations of a sampling bank.
Figure 3B:
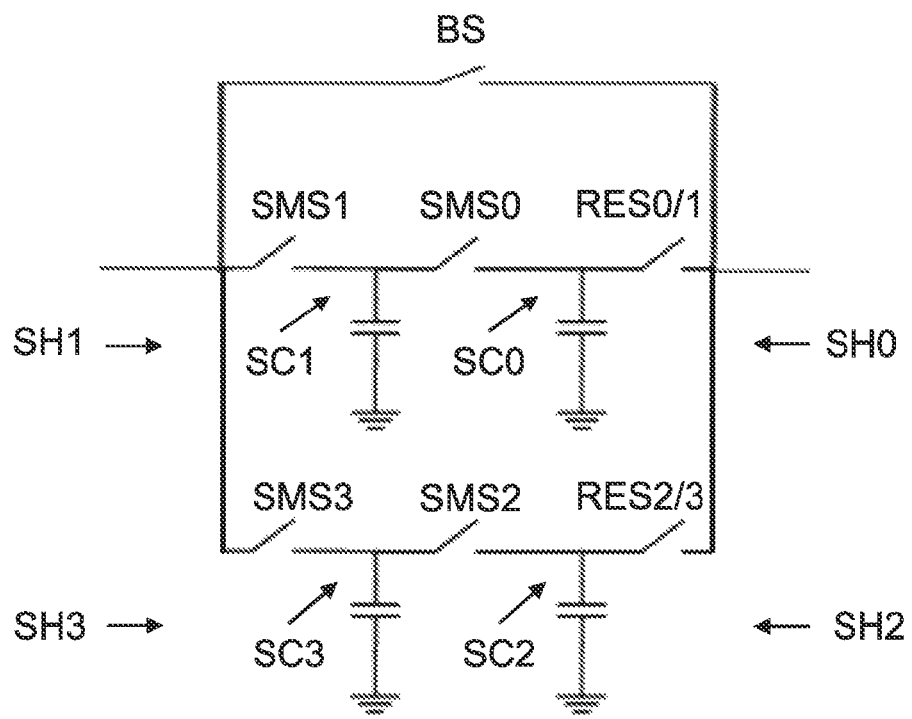

As an alternative to the implementations of FIG. 2A and FIG. 2B, respectively, FIGS. 3A and 3B show implementations where the two sample-and-hold elements SH0, SH1 form a cascade with the two sampling capacitors SC0, SC1 and associated sampling switches SMS0, SMS1. The cascade shares a common readout switch RES0/1. As in the examples of FIG. 2A and FIG. 2B, the bypass switch BS is connected in parallel to both sample-and-hold elements SH0, SH1, i.e. the cascade.

In addition, in the example of FIG. 3B, the structure of FIG. 3A is further equipped with a third and a fourth sample-and-hold element SH2, SH3, which generally have the same structure as the first two sample-and-hold elements SH0, SH1. In particular, the third and the fourth sample-and-hold elements SH2, SH3 form another cascade with the two sampling capacitors SC2, SC3 and associated sampling switches SMS2, SMS3, sharing a common readout switch RES2/3.

The sampling bank of FIG. 3A with two sample-and-hold elements also allows pipelined processing of two voltage levels, for example a reset level voltage and a signal level voltage provided by one of the pixels. The bypass switch BS, as described above, allows to provide a voltage level being present at the input side of the sampling bank directly to the output of the sampling bank without intermediate storage.

The two additional sample-and-hold elements SH2, SH3 of FIG. 3B allow the pipelined processing of four voltage levels, for example reset level voltage and signal level voltage of pixels of two different rows of a column.

Figure 4A:
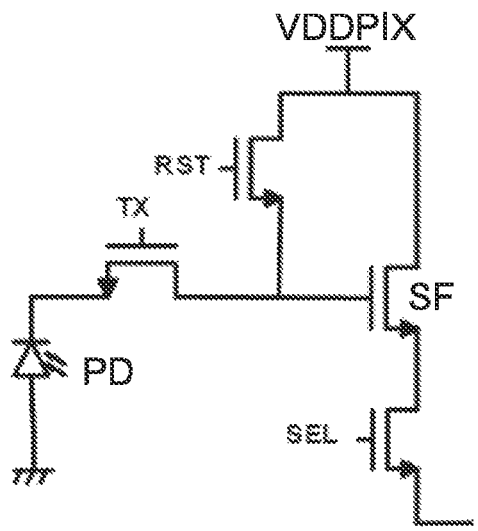
FIG. 4A shows an example implementation of a four-transistor pixel.
Figure 4B:
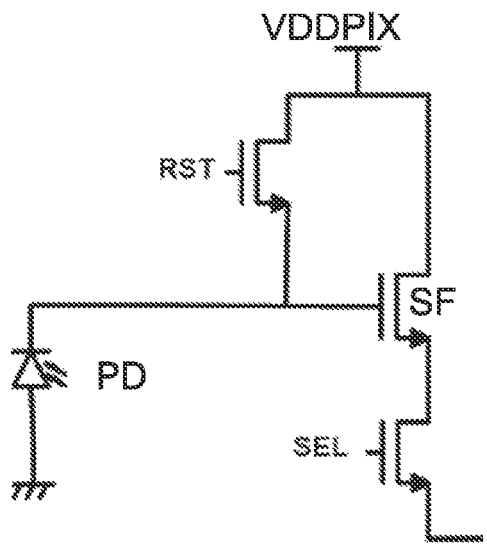
FIG. 4B shows an example implementation of a three-transistor pixel.

Referring now to FIG. 4A and FIG. 4B, non-limiting example implementations of pixels are illustrated. Each of the pixels comprises a photodiode PD coupled to an input of a source follower SF connected between a pixel supply voltage VDDPIX and an output of the pixel via a respective selection transistor controlled by a selection signal SEL. Furthermore, the input of the source follower SF is connected to the pixel supply voltage VDDPIX by means of a reset transistor controlled by a reset signal RST.

While in the pixel of FIG. 4A a transfer gate is present between the photodiode and the source follower SF, controlled by a transfer signal TX, the photodiode PD is connected to the source follower SF directly in the pixel implementation of FIG. 4B. Due to the number of transistors in the pixel, the pixel of FIG. 4A can also be called a 4T pixel while the pixel of FIG. 4B can be called a 3T pixel. In the 3T pixel, the signal level voltage is provided to the pixel output by respective control of the reset transistor.

Other implementations of pixels are possible and do not change the working principle according to the improved signal processing concept, which will be described in more detail below. It is only assumed that each pixel is able to provide a reset level voltage and a signal level voltage at the column bus CB1 in response to respective control.

Figure 5:
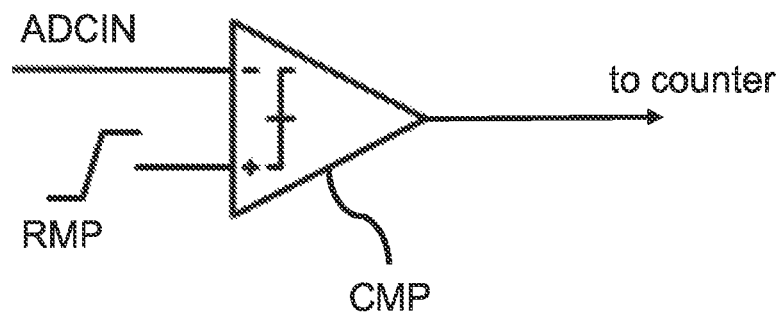
FIG. 5 shows an example symbolic representation of an ADC.

FIG. 5 shows a basic and symbolic representation of a ramp-based ADC as an example ADC to be used at the output of the readout circuit. For example, the output of the readout circuit, i.e. a respective voltage level ADCIN, is provided at a first input of a comparator CMP. At a second input of the comparator CMP, a ramp signal RMP is provided. If the ramp signal RMP crosses the input voltage level ADCIN, a counter is triggered, the counter value representing a digital value of the input voltage level. Ramp-based ADCs are well known in the art and therefore the counter structure is not shown here for reasons of clarity.

Referring back to FIG. 1, the improved signal processing concept allows for increasing the frame rate of image sensors using a so-called pipelined readout architecture. During the readout of a row of pixels in a typical image sensor, several operations take place before the digitized pixel value is obtained. These operations may include CDS, sample-and-hold operations and A-D conversion. In a pipelined readout architecture these operations may take place simultaneously between the readout of the different rows of the pixel column. E.g. while the pixel values of the current row are being stored in the sample-and-hold elements, the values of the previous row are being A-D converted. The slowest operation in the readout of the row will now limit the row time instead of the sum of these operations. Pipelining increases the frame rate of the image sensor in this way.

According to the embodiment of FIG. 1, a feedforward capacitor in form of the charge store C0 is placed between the column input CI1 and the ADC. As the pixel reset level often has a large variation, if this voltage is fed directly into the ADC, a substantial amount of time would be needed to cover the reset voltage range and this would increase the total conversion time of the ADC. Therefore, charge store C0 is introduced before the signal output ADCOUT1 to block the absolute value of the reset level voltage and the signal level voltage. For example, before the reset A-D conversion, e.g. in a calibration phase, the known reference voltage VREF1 is applied at the signal output ADCOUT1, which serves as the reset level.

While pipelining can be used with two sample-and-hold elements, as is shown in the implementation of FIG. 2A, efficiency of the pipelining is further increased with the implementation with four sample-and-hold elements as shown in the implementation of the FIG. 2B. In the following, an example implementation of a readout process within one pixel column shall be explained in conjunction with the signal diagram of FIG. 6.

Figure 6:
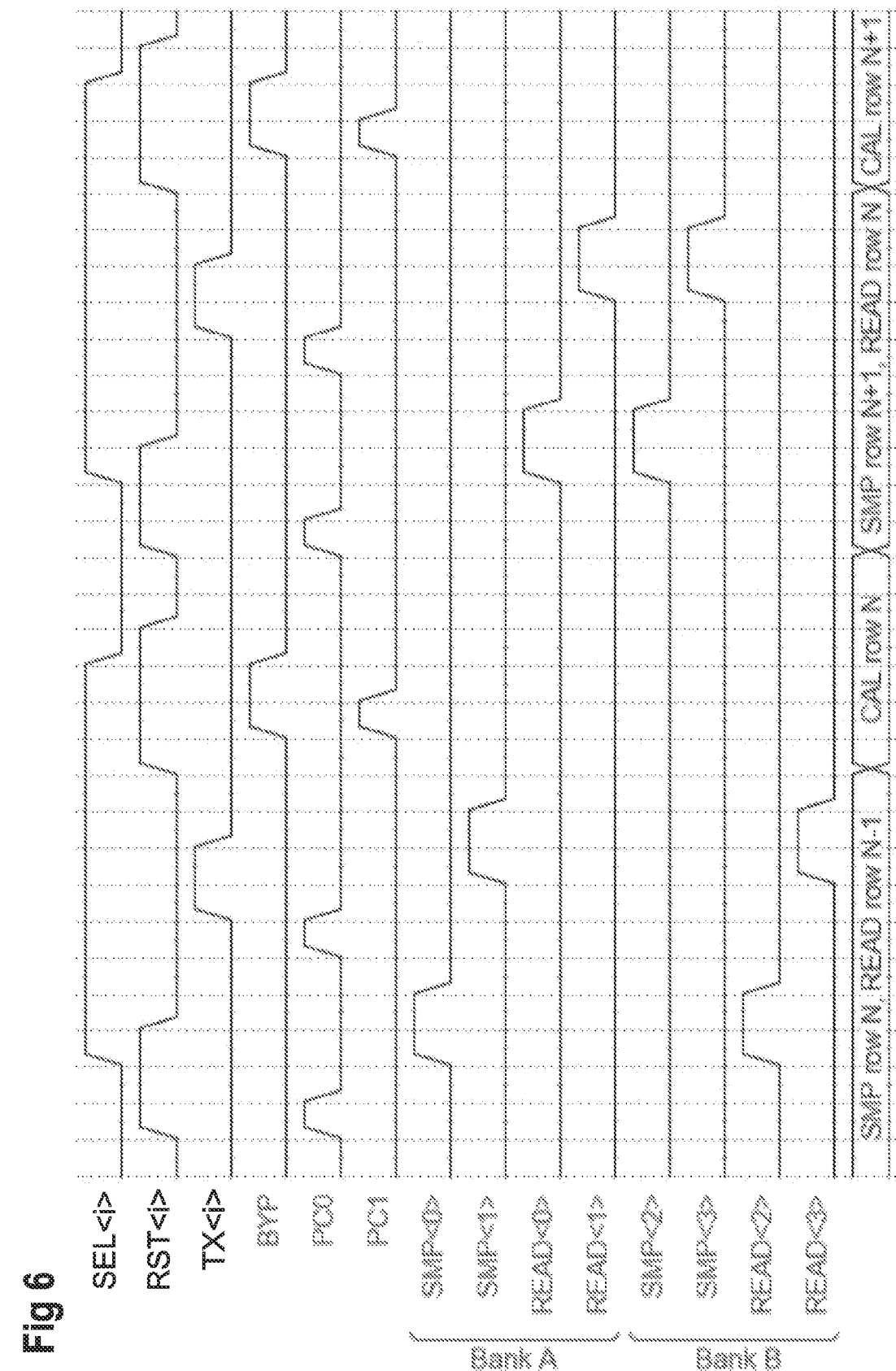
FIG. 6 shows an example signal diagram of control signals in a readout circuit.

FIG. 6 shows an example signal diagram for reading out pixels of a pixel column in a pipelined fashion. The signal diagram is not intended to be complete for a whole pixel column but covers only a limited time of the readout process, which is still suitable to understand the whole readout process.

Accordingly, FIG. 6 shows the course of several signals that may be suitable to read out a 4T pixel like that shown in FIG. 4A, for example. The signal SEL<i> represents a selection signal for a pixel of a specific row i. RST<i> represents a reset signal for the specific pixel in that row i and TX<i> represents the transfer signal for a pixel in a specific row i. It should be noted that the above-mentioned signals SEL<i>, RST<i>, TX<i> could also be represented as two signals each.

The bypass signal BYP controls the bypass switch BS. Charge switch signals PC0, PC1 control the charge switches SPC0, SPC1 respectively. The sampling signals SMP<0:3> respectively control the sampling switches SMS0, SMS1, SMS2, SMS3. Similarly, the readout signals READ<0:3> control the readout switches RES0, RES1, RES2, RES3. At the bottom of the diagram, several phases are indicated. For example, in a first phase, an actual row N is sampled, i.e. i=N, while a previous row N−1, i.e. i=N−1, is read out from the sampling bank. The next phase corresponds to a calibration phase for the actual row N. A further phase corresponds to the sampling of pixels of the next row N+1, i.e. i=N+1, and the readout of the actual row N. Again it follows the calibration phase for the next row N+1. This scheme will now be explained in more detail.

During a first sampling phase, corresponding to sampling of voltage levels of a pixel of row N, the sampling signal SMP<0> is set to high to control the sampling switch SMS0 to a closed state, thereby transferring the reset level voltage from the pixel to the sampling capacitor SC0. This is accomplished by also activating the reset switch and the selection switch in the pixel with the reset signal RST<i> and SEL<i>, with i=N. Sampling the reset level voltage is finished after the reset signal RST<i> goes low. Similarly, the signal level voltage is sampled onto the sampling capacitor SC1 by controlling the sampling switch SMS1 with sampling signal SMP<1> with the transfer signal TX<i> being high. Sampling the signal level voltage is finished after the transfer signal TX<i> goes low. After the first sampling phase follows a calibration phase during which the reset level voltage from the pixel of the actual row N is directly provided to the left terminal of charge store C0 by means of the signals SEL<i>, RST<i> and BYP. Concurrently, the switch SPC1 is closed due to the high level of the signal PC1, such that the first reference voltage VREF1 is provided to the right terminal of the charge store C0.

After the calibration phase, a first readout phase for the row N starts, during which the previously sampled signals of the sample-and-hold elements SH0, SH1 are read out for being provided to the signal output ADCOUT1. Before activating the readout switches RES0, RES1, respectively, the signal PC0 respectively activates the second charge switch SPC0 for providing the second reference voltage to the left side terminal of the charge store C0. In other words, the input node of the charge store C0 is recharged to the second reference voltage VREF0 to avoid memory-induced effects on the charge store. The timing as shown in FIG. 6 can be varied slightly without changing the described sampling and readout scheme in general. For example, the sampling signals SMP<i> could be shifted in time such that they go low again before the reset signal RST<i> or the transfer signal TX<i>, respectively, go low.

It should be noted that during the first readout phase, the reset level voltage is read out first from the first sample-and-hold element SH0, i.e. before the signal level voltage. By precharging the charge store C0 during the calibration phase, and activation of the readout switch RES0 after that, an accurately defined reset level is provided to the signal output ADCOUT1 with this reset level being the reference voltage VREF1. Since VREF1 is independent from variations of the pixel transistors, it will not show or show only small variations across the pixel array. A relatively short ramp in the ADC is sufficient to convert this reset level, thereby reducing the total amount of conversion time. The combination of the precharging of the charge store C0 during the calibration phase with the sampled reset level voltage results in the first reference voltage VREF1 being present at the signal output ADCOUT1, respectively the input of the ADC. So far the process has been described with respect to a bank A of the sampling bank BSH1 corresponding to the first and the second sample-and-hold elements SH1, SH0. In the following, the corresponding pipeline process for the second bank B is described, corresponding to the third and the fourth sample-and-hold elements SH2, SH3. During a second readout phase that at least partially overlaps with or corresponds to the first sampling phase, the previously sampled voltage levels on the third and the fourth sample-and-hold elements SH2, SH3 are read out. As described previously, before each of these readout processes, the left side of the charge store C0 is precharged with the second reference voltage VREF0 by respectively closing the switch SPC0. The voltage levels that are read out correspond to signals from a pixel of a previous row N−1. #

A second sampling phase corresponding to the sampling of voltage levels of a pixel of a next row N+1 is performed. The second sampling phase corresponds to, or at least partially overlaps with, the first readout phase. It should be apparent to the skilled reader that the respective pixel control signals SEL<i>, RST<i>, TX<i> are controlling the pixel of the next row N+1 in this case.

As mentioned before, only a single or a limited number of buffer elements is necessary to provide the reference voltages, in particular the reference voltage VREF1 that forms the basis for the defined reset level conversion in the ADC. Hence, compared to conventional solutions, area and power consumption is reduced while achieving accurate measurement results and fast conversion times.

Generally spoken, a group of M columns (a kernel) may share the buffered reference voltages VREF1, VREF0. In the extreme case, M may comprise the total number of columns (chip level). The switch SPC1 controlled by PC1 however and the switch SPC0 controlled by PC0 are part of the column readout circuit.

If, for example, a ramp-based ADC is used at the signal output ADCOUT1 of each readout circuit, during the reset analog-to-digital conversion phase, the reference VREF1 is present at the input of the comparator, which serves as the reset level RST:

RST=VREF1

During the signal level analog-to-digital conversion phase, the CDS voltage resulting from the difference between the reset voltage VRST and the signal level voltage VSIG will be added to this reference voltage, resulting in:

SIG=VREF1+(VRST−VSIG)

The result of these two analog-to-digital operations can then be subtracted from each other in the digital domain, for example for implementing digital CDS. Therefore, the final output CDS voltage can be made linearly dependent on the input CDS voltage. At the end of the sampling phase, after the pixel signal value has been sampled, the bypass switch BS is activated to connect the pixel output, which now again contains the reset level voltage VRST, to the input of charge store C0. At this point, the comparator is calibrated for the next row, meaning that the input of the comparator is precharged to VREF1 to prepare the ADC for the next conversion. Note that this is an effective use of the available time for one row, since with conventional ADCs the ADC needs to be re-initialized anyway after every conversion and this time can be used for the comparator calibration. Also, the settling of the pixel output at the end of the sampling phase or row time can be very fast, since the sample-and-hold elements, and in particular their sampling capacitors, are not connected to the pixel output. Hence, the improved signal processing concept does not require additional readout time.

Since the left terminal of charge store C0 is driven by the pixel output during the calibration phase, no charge redistribution occurs on this capacitor. This would not be true if there was no bypass switch to bypass the sample-and-hold elements.

While the previous explanations in conjunction with FIG. 6 describe an implementation for reading out a pixel array with 4T pixels like that shown in FIG. 4A, the improved signal processing concept can also be implemented with the 3T pixel structure as is shown in FIG. 4B.

Figure 7:
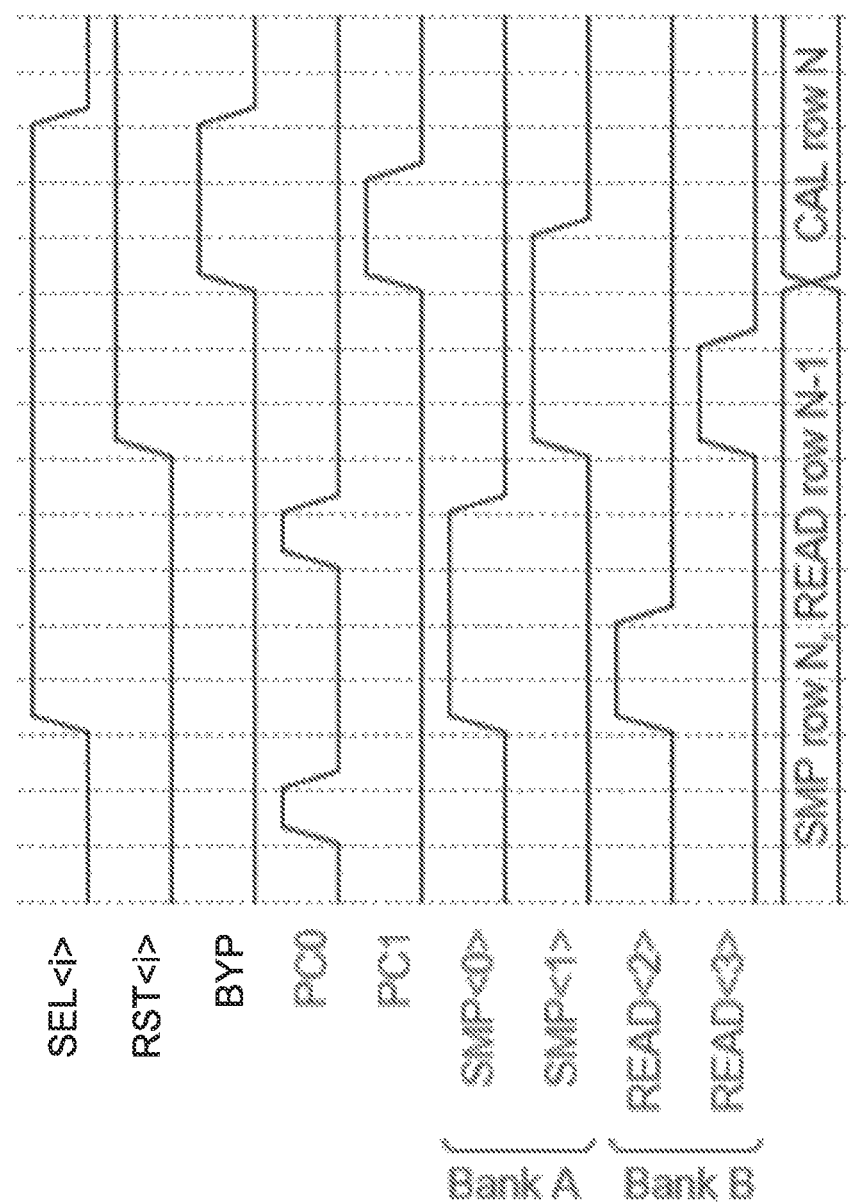
FIG. 7 shows a further example signal diagram of control signals in a readout circuit.

For example, FIG. 7 shows a signal diagram of several signals controlling the readout process with a pixel according to FIG. 4B but still using the readout circuit of FIG. 1 with a sampling bank BSH1 with four sample-and-hold elements. For reasons of clarity, only a single pipelined sampling and readout phase are shown in this diagram which can easily be extended to a full diagram by the skilled person from the disclosure of FIG. 6. In this implementation, in the sampling phase first the signal level voltage is sampled on the first sample-and-hold element SH0 and afterwards the reset level voltage is sampled on the second sample-and-hold element SH1, controlled by the respective sampling signals SMP<0> and SMP<1>.

As can be seen from the bottom description of the diagram, the sampling refers to row N, while the parallel, pipelined readout process refers to the previously sampled row N−1. Accordingly, the voltage level signal is read out before the reset level signal. Hence, the reset level voltage is being read at the end of the row time, respectively the readout phase, such that it does not need to settle anymore, potentially resulting in a speed up or more accurate settling of the calibrated value. Still, a calibration phase follows the sampling/readout phase by precharging the charge store C0 as described before in conjunction with FIG. 6.

If a structure of the sampling bank according to FIG. 3A or FIG. 3B is chosen, a similar timing can be applied. For example, the reset level voltage and the associated signal level voltage can be sampled onto one of the cascades. For instance, the reset level voltage is first sampled onto the "right" sampling capacitors SC0 respectively SC2, employing both sample switches SMS0, SMS1, respectively SMS2, SMS3. Then the signal level voltage can be sampled onto the "left" sampling capacitors SC1 respectively SC3, employing sampling switch SMS1 respectively SMS3. Readout is performed accordingly, which should be apparent to the skilled reader. As in the previous examples, sampling and readout can be performed concurrently on different cascades, thereby allowing the pipelined processing of pixels of different rows.

Figure 8:
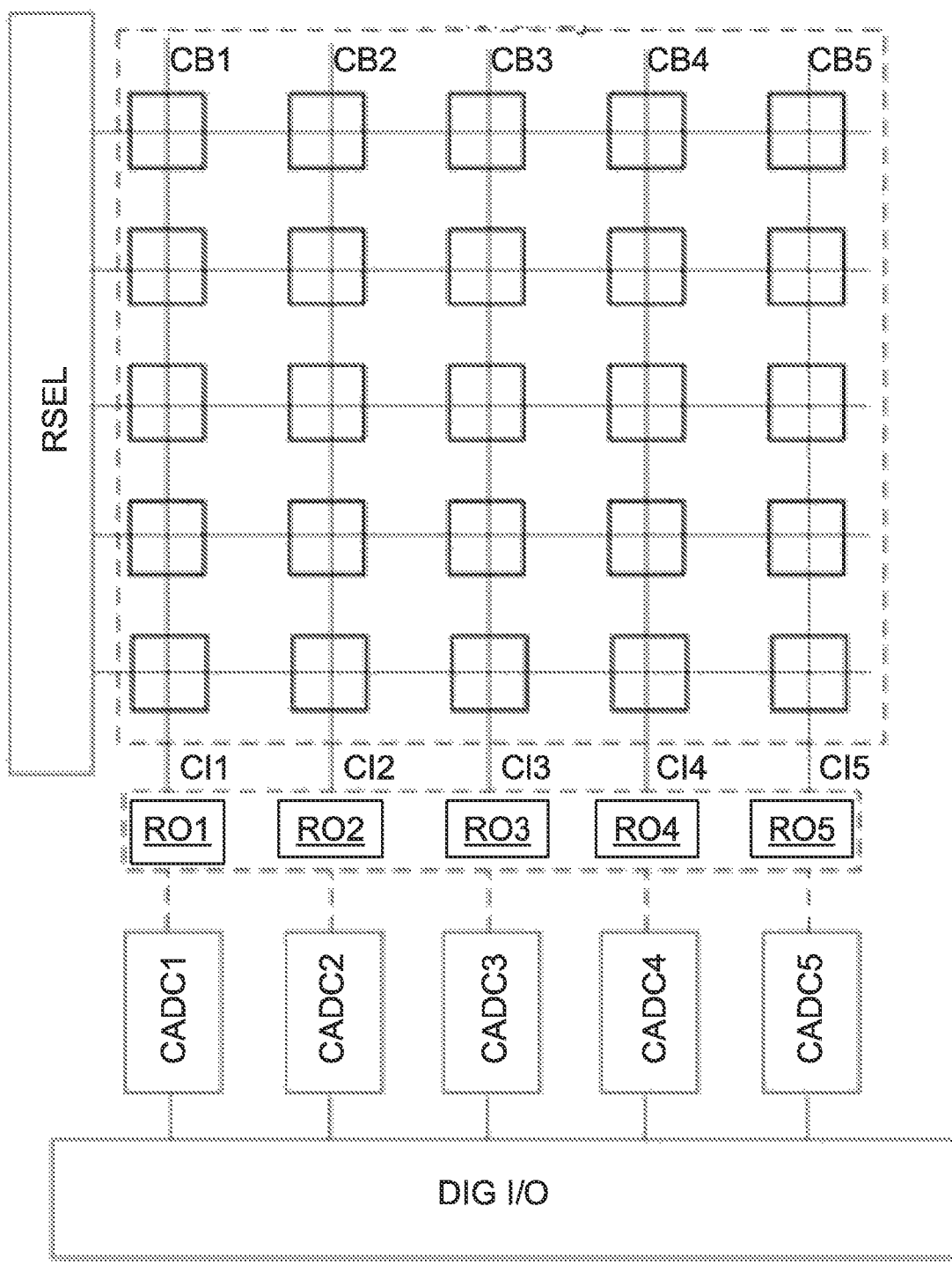
FIG. 8 shows an example implementation of an image sensor.

FIG. 8 shows a schematic representation of an image sensor with a pixel array with five pixel columns with respective pixels connected column buses CB1, CB2, CB3, CB4 and CB5. Each column comprises five rows of pixels that can be controlled with a row selection RSEL. It should be apparent to the skilled reader that the number 5 for columns and rows has been chosen arbitrarily for ease of representation. In practical implementations these numbers are much higher and not necessarily equal, without loss of generality.

For each of the pixel columns there is a readout circuit RO1, RO2, RO3, RO4, RO5 having its respective column input CI1, CI2, CI3, CI4, CI5 connected to the column bus CB1, CB2, CB3, CB4, CB5. The readout circuits together may form a readout stage. The outputs of the readout circuits RO1 to RO5 are connected to respective column ADCs, CADC1, CADC2, CADC3, CADC4, CADC5, the outputs of which are connected to a digital processing block DIG I/O which may further process the converted signal values. The readout circuits of such an image sensor may be implemented according to one of the implementations described above, in particular with respect to FIG. 1.

An image sensor according to one of the implementations described above can be used in camera systems. For example such camera systems may be included in various electronic devices.

Such electronic devices may include smartphones, tablet computers, portable computers and the like, but also larger devices such as personal computers and/or their displays. Electronic devices further include photo or video cameras and smart watches and other wearables. Suitable electronic devices further may be devices for machine vision, medical imaging or automotive imaging.

The invention claimed is:

1. A readout circuit for an image sensor having a pixel array, the pixel array comprising at least one pixel group, in particular pixel column, with a plurality of pixels connected to a group bus, the readout circuit comprising
   a group input for connecting to the group bus;
   a signal output for connecting to an input of an analog-to-digital converter, ADC;
   a first reference terminal for receiving a first reference voltage;
   a second reference terminal for receiving a second reference voltage;
   a sampling bank comprising a first sample-and-hold element and an at least second sample-and-hold element coupled between the group input and an output of the sampling bank and further comprising a bypass switch connected between the group input and the output of the sampling bank;
   a charge store connected between the output of the sampling bank and the signal output;
   a first charge switch connected between the first reference terminal and the signal output; and
   a second charge switch connected between the second reference terminal and the output of the sampling bank.

2. The readout circuit according to claim 1, which is configured:
   during a first sampling phase, to sample a reset level voltage and a signal level voltage received, in particular consecutively received, at the group input from one of the pixels of the at least one pixel group, employing the first sample-and-hold element and the at least second sample-and-hold element;
   during a calibration phase, to close the bypass switch and to connect the signal output to the first reference terminal employing the first charge switch; and
   during a first readout phase, to read out, in particular consecutively read out, the sampled reset level voltage and the sampled signal level voltage from the first sample-and-hold element and the at least second sample-and-hold element.

3. The readout circuit according to claim 2, wherein by closing the bypass switch and connecting the signal output to the first reference terminal during the calibration phase the charge store is charged with a voltage corresponding to a difference between the first reference voltage and a voltage level provided at the group input, in particular the reset level voltage provided at the group input from one of the pixels of the at least one pixel group.

4. The readout circuit according to claim 2, wherein, during the calibration phase, by closing the bypass switch the reset level voltage is provided to the output of the sampling bank.

5. The readout circuit according to claim 2, which is further configured, during the first readout phase, to connect the output of the sampling bank to the second reference terminal employing the second charge switch for a predetermined time before the read out of the sampled reset level voltage and before the read out of the sampled signal level voltage.

6. The readout circuit according to claim 1, wherein the sampling bank further comprises a third sample-and-hold element and a fourth sample-and-hold element, connected in parallel to the first and the second sample-and-hold element.

7. The readout circuit according to claim 2, wherein the sampling bank further comprises a third sample-and-hold element and a fourth sample-and-hold element, connected in parallel to the first and the second sample-and-hold element, and wherein the readout circuit is further configured:
during a second readout phase, which at least partially is overlapping with the first sampling phase, to read out, in particular consecutively read out, a previously sampled reset level voltage and a previously sampled signal level voltage from the third sample-and-hold element and the fourth sample-and-hold element; and
during a second sampling phase, which at least partially is overlapping with the first readout phase, to sample a further reset level voltage and a further signal level voltage received, in particular consecutively received, at the group input from a further one of the pixels of the at least one pixel group, employing the third sample-and-hold element and the fourth sample-and-hold element.

8. The readout circuit according to claim 1, wherein the first sample-and-hold element and the at least second sample-and-hold element
are connected in parallel to each other and to the bypass switch between the group input and the output of the sampling bank; or
form a cascade that is connected between the group input and the output of the sampling bank in parallel to the bypass switch.

9. A readout stage for an image sensor having a pixel array, the pixel array comprising at least two pixel groups, in particular pixel columns, each pixel group with a plurality of pixels connected to a respectively associated group bus of that pixel group, the readout stage comprising, for each of the pixel groups, an associated readout circuit according to claim 1 having its group input connected to the associated group bus.

10. The readout stage according to claim 9, further comprising at least one of the following:
a first voltage buffer for providing the first reference voltage, an output of the first voltage buffer connected to the respective first reference terminals of each of the readout circuits;
a second voltage buffer for providing the second reference voltage, an output of the second voltage buffer connected to the respective second reference terminals of each of the readout circuits.

11. An image sensor comprising a pixel array with at least two pixel groups, in particular pixel columns, each pixel group with a plurality of pixels connected to a respectively associated group bus of that pixel group, and further comprising, for each of the pixel groups, an associated readout circuit according to claim 1 having its group input connected to the associated group bus.

12. The image sensor according to claim 11, further comprising, for each readout circuit, an associated ADC, in particular ramp based ADC, connected to the respective signal output of that readout circuit.

13. An electronic device with a camera system comprising an image sensor according to claim 11.

14. A method for reading out an image sensor having a pixel array and a readout circuit, the pixel array comprising at least one pixel group, in particular pixel column, with a plurality of pixels connected to a group bus, and the readout circuit including a sampling bank comprising a first sample-and-hold element and an at least second sample-and-hold element coupled between the group bus and an output of the sampling bank and further comprising a bypass switch connected between the group input and the output of the sampling bank, and a charge store connected between the output of the sampling bank and a signal output,
the method comprising
during a first sampling phase, sampling a reset level voltage and a signal level voltage received, in particular consecutively received, at the group bus from one of the pixels of the at least one pixel group, employing the first sample-and-hold element and the at least second sample-and-hold element;
during a calibration phase, closing the bypass switch and providing a reference voltage to the signal output; and
during a first readout phase, to read out, in particular consecutively read out, the sampled reset level voltage and the sampled signal level voltage from the first sample-and-hold element and the at least second sample-and-hold element.

15. The method according to claim 14, further comprising during the first readout phase, providing the reference voltage or a further reference voltage to the output of the sampling bank for a predetermined time before the read out of the sampled reset level voltage and before the read out of the sampled signal level voltage.

16. The method according to claim 14, wherein, during the calibration phase, by closing the bypass switch the reset level voltage is provided to the output of the sampling bank.

17. The method according to claim 14, wherein the sampling bank further comprises a third sample-and-hold element and a fourth sample-and-hold element, connected in parallel to the first and the second sample-and-hold element, and wherein the method further comprises
during a second readout phase, which at least partially is overlapping with the first sampling phase, reading out, in particular consecutively reading out, a previously sampled reset level voltage and a previously sampled signal level voltage from the third sample-and-hold element and the fourth sample-and-hold element; and
during a second sampling phase, which at least partially is overlapping with the first readout phase, sampling a further reset level voltage and a further signal level voltage received, in particular consecutively received, at the group bus from a further one of the pixels of the at least one pixel group, employing the third sample-and-hold element and the fourth sample-and-hold element.

\* \* \* \* \*